Patented Apr. 12, 1938

2,114,042

UNITED STATES PATENT OFFICE 2,114,042

SULPHURIC DERIVATIVES OF HIGHER ALCOHOLS

Heinrich Bertsch, Chemnitz, Germany, assignor to American Hyalsol Corporation, Wilmington, Del., a corporation of Delaware No Drawing. Application November 29, 1933, Serial No. 700,355. In Germany March 30, 1928

12 Claims. (Cl. 260—99.12)

This invention relates to the preparation of sulphated higher fatty alcohols, and in certain specific embodiments pertains to sodium lauryl sulphate and sodium myristyl sulphate either alone or associated with other sodium salts of the sulphuric reaction products of n-straight-chain primary alcohols having from 8 to 18 carbon atoms, as new compounds and compositions of matter.

This application is a continuation in part of applicant's copending applications Serial No. 433,815, filed March 6, 1930; Serial No. 650,203, filed January 4, 1933; and Serial No. 614,053, filed May 27, 1932.

One object of the invention is to prepare lauryl sulphate and myristyl sulphate, and their salts. Another object is to prepare sulphuric reaction products of mixed alcohols obtainable by the catalytic hydrogenation of higher fatty acid mixtures or their derivatives or substitution products, for example, glycerides.

In another of its embodiments the invention relates to the catalytic hydrogenation of cocoanut oil and of palm kernel oil to reduce the carboxylic constituents thereof to the corresponding alcohols, the distillation of the reaction products to remove the lower boiling constituents thereof, the sulphation of the residue by means of conventional strong sulphonating agents, and the neutralization of the alkyl sulphuric acid esters so formed to produce salts. A still further object of the invention resides in the application of the novel sulphation products to the cleansing, dispersing, emulsifying and wetting arts. Other objects of the invention will appear hereinafter.

The following examples illustrate various methods of producing the novel products constituting the present invention.

Example 1

One hundred kilograms of a mixture of fatty alcohols mainly consisting of lauryl alcohol, and obtained from cocoanut oil by esterifying the fatty acids with ethyl alcohol, reducing the ethyl ester, distilling the product of the reduction and collecting the first 50% to 60% of the distillate, are heated to a temperature at which the mixture melts, usually at about 30° C., and treated at the said temperature with 50 kilograms of chlorosulphonic acid.

Example 2

One thousand kilograms of cocoanut oil are introduced into an iron mixing tank together with 28 kilograms of the catalyst, prepared as follows: A copper kieselguhr catalyst is prepared by precipitating copper carbonate onto kieselguhr from an aqueous copper nitrate solution by means of sodium carbonate, followed by filtration, washing, drying and pulverizing of the precipitate. There also is added to the mixing tank, 8 kilograms of copper carbonate prepared by precipitation from the nitrate by means of sodium carbonate followed by filtration, washing, drying and pulverizing.

The mixture of cocoanut oil and catalyst thus produced is stirred and warmed to about 50° C., hydrogen being introduced into the mixture and maintained at a pressure of the order of 3500 lbs./sq. in. The mixture is further heated, the hydrogenation starting at about 270° C., and the temperature raised to about 340° C. After about 45 minutes, the reduction product is discharged from the reaction vessel, is cooled and filtered to remove the catalyst. The water layer is then separated from the oil layer, the latter comprising crude lauryl alcohol together with other alcohols having from 8 to 18 carbon atoms.

The crude lauryl alcohol may then be vacuum steam distilled under an absolute pressure of about 20 mm. to produce the desired product. A forerun fraction of 125 kilograms per 1000 kilograms from the crude lauryl alcohol is removed. Distillation starts at about 150° C. and finishes at about 250° C. The main cut, (distilled off up to 250° C.,) comprising 850 kilograms per 1000 kilograms of crude lauryl alcohol, consists mainly of lauryl alcohol together with myristyl, cetyl, and stearyl alcohols in smaller amounts, and other alcohols ranging from 8 to 18 carbon atoms in still smaller quantities.

About 300 kilograms of the lauryl alcohol fraction obtained as described above is charged into a 1200 liter enameled sulphonator vessel and is cooled to about 33° C. while being stirred. There is then slowly added with stirring 160 kilograms of chlorosulphonic acid, the acid being added at such a rate that the temperature does not go above 40° C. The acid is added in portions during a period of from one to one and one-half hours, and after all of the acid is introduced the stirring is continued for about five minutes at 38° to 40° C., after which the reaction mass is dropped into a 6000 liter lead-lined iron neutralizing tank into which previously has been charged 310 kilograms of water and 175 kilograms of 35% sodium hydroxide solution. The product is a paste comprising the sodium salts of lauryl and the other alkyl sulphate esters.

To obtain a powder, the paste together with water can be sprayed into a hot air chamber maintained at a temperature of about 100° C. whereby the water is removed and a light fluffy powdered product is obtained.

The above examples illustrate the production of mixed alkyl sulphate esters and their salts. If it is not desired to produce mixed sulphate esters, the individual alcohols, for example, lauryl or myristyl, can be sulphated and/or neutralized in the same way.

Sulphation is effected by the use of strong sulphonating agents such as 100% H₂SO₄, chlorsulphonic acid or fuming sulphuric acid. The sulphation temperatures may be varied according to the specific alcohol or mixtures of alcohols to be treated, but will ordinarily run from 0° C. to 50° C., the preferred temperature being 30° C. to 40° C. The alcohols will ordinarily be heated up to their melting points before sulphating, although the use of solvents for the alcohols permits the use of lower temperatures.

The action of the sulphating agents may be assisted by the use of organic or inorganic dehydrating agents, for example, acetic anhydride, phosphorous pentoxide and the like.

The major reaction taking place under the conditions described in the examples is one of sulphation as illustrated in the following equation:

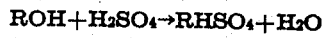

$$ROH + H_2SO_4 \rightarrow RHSO_4 + H_2O$$

Under certain other conditions, and especially where temperatures above 40° C. are used, a certain amount of sulphonation generally takes place.

The normal straight-chain higher fatty alcohols such as lauryl and myristyl may be readily obtained by the catalytic hydrogenation of palm kernel or cocoanut oil. However, the source of the alcohol is not material to the broadest concepts of the present invention, except to indicate that the starting materials employed are readily available at a low cost.

The products produced by the reactions described above are true alkyl sulphuric acids, particularly mono esters of sulphuric acid. Normally when these esters are employed in industrial processes, they are used in the form of their salts produced by neutralizing with any of the various alkalies such as the hydroxides of sodium, potassium, lithium, or with the hydroxides of ammonium, calcium or magnesium. The salts may also be produced by neutralizing the sulphate esters with various metal oxides or with metal salts which will react to give salts of the sulphuric esters, for example, lead acetate.

The products obtained in accordance with the present invention, consisting principally of true esters or their salts are very stable under ordinary conditions of industrial use. Many of their salts, namely, the sodium, potassium, lithium, ammonium, magnesium and lead salts, are water-soluble and are of great utility in the various arts. They are valuable agents for wetting and finishing artificial and natural textile fibers, for treating leather, for making pharmaceutical preparations, in the art of working metal, for manufacturing insecticides and dust-binding media, in ceramics, and as a foaming fire extinguishing medium (in which case 5% of sulphate ester salt may be added to a 10% solution of sodium bicarbonate and the solution used in conjunction with sulphuric acid as a gas liberating agent). The sulphate esters and their salts may furthermore be used wherever moistening, permeating, emulsification, dispersing, colloidal cleaning, and softening properties are desired.

The quantities of materials and reaction conditions set out in the above description and examples may be varied within reasonable limits, and any such variation which is within the spirit of the invention is intended to be included within the scope of the claims.

I claim:

1. The method of producing agents of the class described, which comprises removing substantially all of the alcohols having a number of carbon atoms less than lauryl alcohol from the mixture of alcohols resulting from the catalytic hydrogenation of a member of the group consisting of cocoanut and palm kernel oils, thereby leaving a residue comprising essentially lauryl, myristyl, cetyl and stearyl alcohols, and then sulphating this residue.

2. A process of producing agents of the class described comprising reducing the carboxylic constituents of a member of the group consisting of cocoanut and palm kernel oil into alcohols, distilling off the lower boiling constituents and treating the residual higher boiling alcohol mixture with a sulphonating agent at about the temperature at which the mixture melts, and neutralizing the resulting mass composed principally of the sulphate of lauryl alcohol with a base.

3. A process of producing agents of the class described comprising reducing the carboxylic constituents of a member of the group consisting of cocoanut and palm kernel oil into alcohols, distilling off the lower boiling constituents and treating the residual higher boiling alcohol mixture with chlorsulphonic acid added in small portions during constant stirring at about the temperature at which the mixture melts, and neutralizing the resulting mass composed principally of sulphate of lauryl alcohol with a base.

4. The process of producing agents of the class described, comprising reducing the carboxylic constituents of a member of the group consisting of cocoanut and palm kernel oil, into alcohols, distilling off the lower boiling constituents and sulphonating the residual higher boiling alcohol mixture which comprises essentially lauryl, myristyl, cetyl, and stearyl alcohols.

5. The process of producing agents of the class described, comprising reducing the carboxyl constituents of a member of the group consisting of cocoanut and palm kernel oil, into alcohols, producing a fraction comprising essentially lauryl, myristyl, cetyl and stearyl alcohols, by distilling off about 125 kgs. per 1000 kgs. of original alcohol mixture, and leaving out a residue of about 25 kgs. per 1000 kgs., and sulphonating the said higher boiling alcohol mixture.

6. The agents of the class described comprising a mixture of sulphonated alcohols consisting essentially of lauryl, myristyl, cetyl and stearyl normal primary alcohols.

7. Water soluble salts of the sulphonated mixture of alcohols described in claim 6.

8. The agents of the class described comprising principally the sulphate ester of normal primary lauryl alcohol, but also containing sulphate esters of myristyl, cetyl, and stearyl normal primary alcohols.

9. Water soluble salts of the sulphate ester mixture described in claim 8.

10. In the production of agents of the class described wherein cocoanut oil is catalytically hydrogenated to produce a mixture of alcohols, the steps comprising vacuum steam distilling the alcohol mixture under an absolute pressure of about 20 mm., removing the first about 12½% of the distillate, collecting separately the fraction boiling up to about 250° C., sulphating this latter fraction of alcohol and neutralizing the resulting acid esters forming water soluble salts.

11. The method of producing agents of the class described, which comprises distilling off substantially all of the alcohols having a number of carbon atoms less than lauryl alcohol from a mixture of alcohols resulting from the catalytic hydrogenation of cocoanut oil, thereby leaving a residue comprising essentially lauryl, myristyl, cetyl and stearyl alcohols, and then sulphating this residual alcohol mixture.

12. Process of producing wetting and finishing agents for the treatment of textile fibers and leather which comprises catalytically hydrogenating palm kernel oil, thereby producing a mixture of alcohols corresponding to the fatty acids of said oil, distilling said mixture of alcohols to separate out the lower boiling alcohols from said mixture, then sulphonating the remaining alcohols and neutralizing them to form water soluble salts.

HEINRICH BERTSCH.